(12) United States Patent
Naka et al.

(10) Patent No.: US 6,546,753 B2
(45) Date of Patent: Apr. 15, 2003

(54) METHOD OF PRODUCING AN ALKALI-FREE GLASS

(75) Inventors: Jun Naka, Kyoto (JP); Toshiharu Narita, Otsu (JP); Shinkichi Miwa, Nishinomiya (JP); Shigeru Yamamoto, Kyoto (JP)

(73) Assignee: Nippon Electric Glass Co. Ltd., Otsu (JP)

( * ) Notice: Subject to any disclaimer, the term of this patent is extended or adjusted under 35 U.S.C. 154(b) by 0 days.

(21) Appl. No.: 09/907,288

(22) Filed: Jul. 17, 2001

(65) Prior Publication Data

US 2002/0011080 A1 Jan. 31, 2002

Related U.S. Application Data

(62) Division of application No. 08/911,945, filed on Aug. 20, 1997.

(30) Foreign Application Priority Data

| Aug. 21, 1996 | (JP) | 8-239712 |
| Dec. 18, 1996 | (JP) | 8-354324 |
| Apr. 18, 1997 | (JP) | 9-116464 |
| Apr. 18, 1997 | (JP) | 9-116465 |
| Jul. 24, 1997 | (JP) | 9-215793 |

(51) Int. Cl.$^7$ ................................................. C03B 5/16
(52) U.S. Cl. .................... 65/134.3; 65/134.1; 501/55; 501/56; 501/69; 501/70
(58) Field of Search .................. 65/134.1, 134.3; 501/55, 56, 69, 70

(56) References Cited

U.S. PATENT DOCUMENTS

| 4,994,415 A | 2/1991 | Imai et al. |
| 5,770,535 A | 6/1998 | Brix et al. |
| 5,824,127 A | * 10/1998 | Bange et al. |

FOREIGN PATENT DOCUMENTS

| EP | 0 805 125 | 11/1997 |

* cited by examiner

Primary Examiner—Michael Colaianni
(74) Attorney, Agent, or Firm—Collard & Roe, P.C.

(57) ABSTRACT

An alkali-free glass applicable to a light transparent glass substrate in a liquid crystal display essentially consists, by weight, of basic elements of 40–70% $SiO_2$, 6–25% $Al_2O_3$, 5–20% $B_2O_3$, 0–10% MgO, 0–15% CaO, 0–30% BaO, 0–10% SrO, and 0–10% ZnO, and a fining agent of a combination of 0.05–3% $Sb_2O_3$ and at least one of 0.05–2% $SnO_2$ and 0.005–1% $Cl_2$, which fining agent makes the resultant glass free from bubbles without the use of toxic $As_2O_3$ which has been known as the fining agent in the art.

5 Claims, No Drawings

METHOD OF PRODUCING AN ALKALI-FREE GLASS

This is a divisional of copending application Ser. No. 08/911,945, filed on Aug. 20, 1997, and which designated the U.S.

BACKGROUND OF THE INVENTION

This invention relates to an alkali-free glass and, in particular, to an alkali-free glass for use as a light transparent glass substrate for a liquid crystal display and the like as well as a method of producing the same.

Conventionally, an alkali-free glass has been used as the light transparent glass substrate for the liquid crystal display and the like. The alkali-free glass for use in such a display is required to be free from bubbles such as blisters and seeds resulting in a display defect, in addition to various characteristics such as heat resistance and chemical resistance.

To meet such a demand, various kinds of alkali-free glasses have been proposed. U.S. Pat. No. 4,994,415 discloses an $SiO_2$—$Al_2O_3$—$B_2O_3$—CaO—BaO as one of the alkali-free glasses.

In order to obtain a glass without bubbles, it is important to select a fining agent capable of generating a fining gas both in a relatively low-temperature range in which batch decomposition and degassing is started and in a relatively high-temperature range in which fining and homogenization of a glass are caused. Specifically, the fining agent serves to expel a gas generating during the batch decomposition and degassing of a glass material, and to enlarge very small bubbles remaining in the glass melt during fining and homogenization processes, whereby enlarged bubbles float up in the glass melt and leave the glass melt.

In the meanwhile, the alkali-free glass for use as a glass substrate for a liquid crystal display is high in viscosity of the glass melt so that a melting process is carried out at a high temperature in comparison with a glass containing an alkali component. In the alkali-free glass of the type, the batch decomposition and degassing generally occurs at 1200–1300° C. while the fining and the homogenization are performed at a high temperature of 1400° C. or more. Under the circumstances, the fining agent is required to produce the fining gas in a wide temperature range (on the order of 1200–1600° C.). Presently, $As_2O_3$ is widely used as the fining agent.

However, $As_2O_3$ is highly toxic and may possibly cause environmental pollution during a manufacturing process of the glass and during disposal of a waste glass. In this reason, the use of $As_2O_3$ is being limited.

SUMMARY OF THE INVENTION

It is an object of the present invention to provide an alkali-free glass which does not use $As_2O_3$ as a fining agent and which is free from bubbles resulting in a display defect, and to provide a method of producing the same.

As a result of various experiments, the present inventors have found the fact that above-mentioned object is achieved by using a combination of $Sb_2O_3$ and at least one of $SnO_2$ and chloride, as a fining agent instead of $As_2O_3$.

According to the present invention, there is provided an alkali-free glass essentially consisting of basic elements of 40–70% $SiO_2$, 6–25% $Al_2O_3$, 5–20% $B_2O_3$, 0–10% MgO, 0–15% CaO, 0–30% BaO, 0–10% SrO, and 0–10% ZnO, and a fining agent of a combination of 0.05–3% $Sb_2O_3$ and at least one of 0.05–2% $SnO_2$ and 0.005–1% $Cl_2$, on the base of the weight percent.

According to the present invention, there is also provided a method of producing an alkali-free glass having a basic composition essentially consisting by weight of 40–70% $SiO_2$, 6–25% $Al_2O_3$, 5–20% $B_2O_3$, 0–10% MgO, 0–15% CaO, 0–30% BaO, 0–10% SrO, and 0–10% ZnO, by preparing a glass batch having the basic composition free from alkali metal oxide, melting the glass batch, and forming the glass melt, which is characterized by adding a combination of 0.05–3 wt % $Sb_2O_3$ and at least one of 0.05–2 wt % $SnO_2$ and 0.01–2 wt % chloride in terms of $Cl_2$ as a fining agent into the glass batch.

$Sb_2O_3$ and $SnO_2$ used in the present invention generate a large amount of fining gas (oxygen gas) as a result of chemical reaction following variation in valence of Sb ions and Sn ions. Specifically, $Sb_2O_3$ (trivalent) is at first changed to $Sb_2O_5$ (pentavalent) in a low-temperature range on the order of several hundred degree in ° C. and then returns to $Sb_2O_3$ (trivalent) around 1200–1300° C. At this time, a large amount of fining gas is released. Likewise, when $SnO_2$ (quadrivalent) is changed to SnO (bivalent) at 1400° C. or more, a large amount of fining gas is released. On the other hand, chloride is decomposed and volatilized in a temperature range not lower than 1200° C. to generate the fining gas (for example, chroline gas). Particularly, decomposition and volatilization are very active at a high-temperature range not lower than 1400° C. to generate a large amount of fining gas.

Therefore, the use of a combination of $Sb_2O_3$ and at least one of $SnO_2$ and chloride as the fining agent provides a high fining effect at a wide temperature range from a comparatively low temperature for the batch decomposition and degassing to a high temperature for fining and homogenizing. Thus, it is possible to provide the alkali-free glass without bubbles resulting in a display defect.

DESCRIPTION OF PREFERRED EMBODIMENTS

Next, description will be made about a method of producing of an alkali-free glass according to the present invention.

At first, a raw glass mixture or a glass batch is prepared so as to obtain a glass having the above-mentioned composition. Description will hereafter be made about the content of each component in the composition and the reason why the content is so defined.

$SiO_2$ is a component serving as a network of the glass. The content of $SiO_2$ is 40–70%, preferably, 45–65%. When the content is less than 40%, chemical resistance is degraded and a strain point of the glass is lowered so that heat resistance is degraded. When the content is more than 70%, high-temperature viscosity is increased so that the meltability is deteriorated and that devitrified substances of cristobalite readily precipitate.

$Al_2O_3$ is a component to improve the heat resistance and devitrification resistance of the glass. The content of $Al_2O_3$ is 6–25%, preferably, 10–20%. When the content of $Al_2O_3$ is less than 6%, the devitrification temperature remarkably rises so that the devitrification is readily caused to occur in the glass. When the content is more than 25%, acid resistance, more particularly, buffered-hydrofluoric-acid resistance is degraded so that the cloudness is readily caused to occur on the surface of a glass substrate.

$B_2O_3$ is a component serving as a flux to lower the viscosity and to facilitate melting of the glass. The content of $B_2O_3$ is 5–20%, preferably, 6–15%. When the content of $B_2O_3$ is less than 5%, the effect as the flux is insufficient. When the content is more than 20%, the hydrochloric acid resistance is degraded and the strain point is lowered so that the heat resistance is degraded.

MgO is a component to decreasing the high-temperature viscosity without lowering the strain point so as to facilitate melting of the glass. The content of MgO is 0–10%, preferably, 0–7%. When the content of MgO is more than 10%, the buffered-hydrofluoric-acid resistance of the glass is seriously degraded.

CaO has a function similar to MgO. The content of CaO is 0–15%, preferably, 0–10%. When the content of CaO is more than 15%, the buffered-hydrofluoric-acid resistance of the glass is seriously degraded.

BaO is a component to improve the chemical resistance and the devitrification resistance of the glass. The content of BaO is 0–30%, preferably, 0–20%. When the content of BaO is more than 30%, the strain point is lowered so that the heat resistance is degraded.

SrO has an effect similar to BaO. The content of SrO is 0–10%, preferably, 0–7%. The content of SrO more than 10% is unfavorable because the devitrification is increased.

ZnO is a component to improve the buffered-hydrofluoric-acid resistance and the devitrification resistance. The content is 0–10%, preferably, 0–7%. When the content of ZnO is more than 10%, the glass tends to be devitrified and the strain point is lowered so that the heat resistance can not be assured.

When the total content of MgO, CaO, BaO, SrO, and ZnO is less than 5%, the high-temperature viscosity is increased so that the meltability is degraded and the glass is readily devitrified. The total content more than 30% is unfavorable because the heat resistance and the acid resistance are degraded.

In addition to the above-described components, it is possible to add $ZrO_2$, $TiO_2$, $Fe_2O_3$, and the like up to 5% in total.

Next, a combination of $Sb_2O_3$ and at least one of $SnO_2$ and chloride is added as a fining agent to the glass batch. As a material for chloride, $BaCl_2$, $CaCl_2$, and the like can be used. As a material for $Sb_2O_3$, a pentavalent Sb compound such as $Sb_2O_5$ can be used instead of $Sb_2O_3$. The amounts of $Sb_2O_3$ and $SnO_2$ to be added is 0.05–3 wt % and 0.05–2 wt %, respectively, with respect to the raw glass mixture as 100 wt %. On the other hand, the amount of chloride is 0.01–2 wt % in terms of $Cl_2$, that is, an amount for producing 0.01–2 wt % $Cl_2$ by decomposition of the chloride. When the content of $Sb_2O_3$ is less than 0.05%, it is difficult to expel the gas generating during the batch decomposition and degassing. When the content of $SnO_2$ is less than 0.05% and the chloride is less than 0.01% in terms of $Cl_2$, it is difficult to remove the bubbles remaining in the glass melt during the fining and homogenizing. On the other hand, when the content of $SnO_2$ is more than 2% and the content of $Sb_2O_3$ is more than 3%, the glass tends to be devitrified. Furthermore, when the chloride is more than 2% in terms of $Cl_2$, the amount of volatilization is excessive so that the glass tends to be deteriorated. It is possible to use only one of $SnO_2$ and chloride. However, the use of both of them in combination is favorable because the excellent fining effect is obtained.

Then, the glass batch thus prepared is melted. When the glass batch is heated, at first the batch decomposition and degassing occurs. At this time, the oxygen gas generates as a result of chemical reaction following the variation in valence of $Sb_2O_3$. Therefore, the gas generating at the time of batch decomposition and degassing is expelled from the glass melt. Furthermore, during the fining and homogenizing at a higher temperature, the oxygen gas generates as a result of chemical reaction following the variation in valence of $SnO_2$. In addition, chloride is decomposed and volatilized to produce the chlorine gas or chlorine compound gas. Thus, very small bubbles remaining in the glass melt are removed.

Then, the glass melt is formed into a desired shape. For use as a display, the glass melt is formed into a thin plate shape by the use of a fusion process, a downdraw process, a float process, a roll-out process, and the like.

Thus, it is possible to obtain the alkali-free glass of the present invention, essentially consisting of basic elements of 40–70% $SiO_2$, 6–25% $Al_2O_3$, 5–20% $B_2O_3$, 0–10% MgO, 0–15% CaO, 0–30% BaO, 0–10% SrO, and 0–10% ZnO and a combination of 0.05–3% $Sb_2O_3$ and at least one of 0.05–2% $SnO_2$ and 0.005–1% $Cl_2$ as the fining agent.

In the following, the alkali-free glass of the present invention will be described in conjunction with specific examples.

EXAMPLE 1

Tables 1 and 2 show the effects of $Sb_2O_3$, $SnO_2$, and chloride. Herein, a sample a is a conventional alkali-free glass with $As_2O_3$ added as a fining agent. A sample b is an alkali-free glass prepared from the sample a with $As_2O_3$ removed therefrom. A sample c is an alkali-free glass with only $Sb_2O_3$ added as a fining agent. A sample d is an alkali-free glass with only $SnO_2$ added as a fining agent. A sample e is an alkali-free glass with only chloride ($BaCl_2$) added as a fining agent. A sample f is an alkali-free glass according to the present invention with $Sb_2O_3$ and $SnO_2$ used in combination. A sample g is an alkali-free glass of this invention with $Sb_2O_3$ and chloride used in combination. A sample h is an alkali-free glass according to the present invention with $Sb_2O_3$, $SnO_2$, and chloride used in combination.

In Tables 1 and 2, each of the sample glass batches consists of a total amount of 100 wt % of glass forming ingredients of $SiO_2$ thorough ZnO in the Tables and an addition of the fining agent of $Sb_2O_3$ through $As_2O_3$ alone or in combination.

TABLE 1

| | | (wt %) | | | | |
|---|---|---|---|---|---|---|
| Sample No. | | a | b | c | d | e |
| Glass Batch Composition | $SiO_2$ | 60.0 | 60.0 | 60.0 | 60.0 | 60.0 |
| | $Al_2O_3$ | 16.0 | 16.0 | 16.0 | 16.0 | 16.0 |
| | $B_2O_3$ | 8.5 | 8.5 | 8.5 | 8.5 | 8.5 |
| | MgO | 4.0 | 4.0 | 4.0 | 4.0 | 4.0 |
| | CaO | 1.0 | 1.0 | 1.0 | 1.0 | 1.0 |
| | BaO | 6.0 | 6.0 | 6.0 | 6.0 | 6.0 |
| | SrO | 3.5 | 3.5 | 3.5 | 3.5 | 3.5 |
| | ZnO | 1.0 | 1.0 | 1.0 | 1.0 | 1.0 |
| | $Sb_2O_3$ | — | — | 0.3 | — | — |
| | $SnO_2$ | — | — | — | 0.3 | — |
| | $Cl_2$ | — | — | — | — | 1.0 |
| | $As_2O_3$ | 0.3 | — | — | — | — |
| Fineness | 1500° C. · 1 hr | ⊚ | X | Δ | Δ | Δ |
| | 1550° C. · 1 hr | ⊚ | X | Δ | ○ | Δ |

TABLE 2

|  | Sample No. | f (wt %) | g | h |
|---|---|---|---|---|
| Glass Batch Composition | $SiO_2$ | 60.0 | 60.0 | 60.0 |
|  | $Al_2O_3$ | 16.0 | 16.0 | 16.0 |
|  | $B_2O_3$ | 8.5 | 8.5 | 8.5 |
|  | MgO | 4.0 | 4.0 | 4.0 |
|  | CaO | 1.0 | 1.0 | 1.0 |
|  | BaO | 6.0 | 6.0 | 6.0 |
|  | SrO | 3.5 | 3.5 | 3.5 |
|  | ZnO | 1.0 | 1.0 | 1.0 |
|  | $Sb_2O_3$ | 0.3 | 0.3 | 0.3 |
|  | $SnO_2$ | 0.3 | — | 0.3 |
|  | $Cl_2$ | — | 1.0 | 1.0 |
|  | $As_2O_3$ | — | — | — |
| Fineness | 1500° C. · 1 hr | ○ | ○ | ◎ |
|  | 1550° C. · 1 hr | ○ | ○ | ◎ |

Each of the samples was prepared as follows.

Glass materials were mixed to obtain a glass batch having a composition specified in Tables. The glass batch was melted in an electric furnace to obtain glass melt. At this time, two types of glass melt were prepared one of which was melted at 1500° C. for 1 hour in order to evaluate the fineness or fining characteristic during the batch decomposition and degassing and the other of which was melted at 1550° C. for 1 hour in order to evaluate the fineness during fining and homogenizing. Next, the glass melt was poured on a carbon table and slowly cooled. Thereafter, the number of bubbles remaining in the glass were counted so as to determine the fineness. Here, the fineness means a measure which shows a degree of numbers of bubbles remaining in the glass as the results of the fining action or effect by the fining agents. The fineness is classified into four ranks, that is "bad", "not good", "good" and "very good", according to the number of bubbles. The ranks were shown in the tables by symbols X, Δ, ○, and ◎ representing the cases where the number of bubbles in the glass of 100 g is more than 1000, 101–1000, 11–100, and 10 or less, respectively. In the composition of the glass batch shown in these Tables, the content of each component is represented in terms of oxide except that the content of chloride is represented in terms of $Cl_2$.

As is obvious from Tables 1 and 2, the sample b with no fining agent added seriously degrades in fineness.

The sample c with only $Sb_2O_3$ added generated a large amount of fining gas during the batch decomposition and degassing. However, a sufficient amount of fining gas was not generated during fining and homogenizing. As a result, the fineness was degraded.

The sample d with only $SnO_2$ added generated a large amount of fining gas during fining and homogenizing. However, the fineness was insufficient during batch decomposition and degassing. As a result, the fineness was inferior as compared with the sample a with $As_2O_3$ added.

Similarly, the sample e with only chloride added generated a large amount of fining gas during fining and homogenizing. However, a sufficient amount of fining gas was not generated during batch decomposition and degassing. As a result, the fineness was degraded. On the other hand, the fineness was excellent in each of the samples f to h with $Sb_2O_3$, $SnO_2$, and/or chloride added.

EXAMPLE 2

Tables 3 to 6 show examples (Samples Nos. 1 to 20) of the alkali-free glass obtained according to the present invention. The amount of each of ingredients is represented by the weight percent in each sample glass produced.

TABLE 3

|  | Sample No. | 1 (wt %) | 2 | 3 | 4 | 5 |
|---|---|---|---|---|---|---|
| Glass Composition | $SiO_2$ | 54.0 | 56.3 | 58.7 | 62.3 | 64.4 |
|  | $Al_2O_3$ | 19.6 | 10.7 | 16.5 | 17.5 | 19.5 |
|  | $B_2O_3$ | 10.5 | 8.4 | 8.3 | 8.5 | 5.5 |
|  | MgO | — | — | 3.7 | 4.5 | 0.3 |
|  | CaO | 3.1 | 5.4 | 1.0 | — | 5.9 |
|  | BaO | 1.8 | 13.0 | 5.8 | 1.1 | 0.3 |
|  | SrO | 8.9 | 4.2 | 3.1 | 0.6 | 0.6 |
|  | ZnO | — | 1.3 | 0.9 | 2.7 | — |
|  | $Sb_2O_3$ | 0.9 | 0.4 | 1.2 | 1.3 | 1.7 |
|  | $SnO_2$ | 1.2 | 0.3 | 0.8 | 1.5 | 1.8 |
|  | $Cl_2$ | — | — | — | — | — |
| Fineness | 1500° C. · 1 hr | ○ | ○ | ○ | ○ | ○ |
|  | 1550° C. · 1 hr | ○ | ○ | ○ | ○ | ○ |
| Strain Point (° C.) |  | 677 | 628 | 662 | 671 | 710 |
| Hydrochloric-acid Resistance |  | ○ | ○ | ○ | ○ | ○ |
| Buffered-hydrofluoric-acid Resistance |  | ○ | ○ | ○ | ○ | ○ |

TABLE 4

|  | Sample No. | 6 (wt %) | 7 | 8 | 9 | 10 |
|---|---|---|---|---|---|---|
| Glass Composition | $SiO_2$ | 58.4 | 56.2 | 54.6 | 59.3 | 62.4 |
|  | $Al_2O_3$ | 16.5 | 11.0 | 19.9 | 16.4 | 17.8 |
|  | $B_2O_3$ | 9.0 | 8.3 | 10.6 | 8.5 | 8.4 |
|  | MgO | — | — | — | 3.9 | 4.7 |
|  | CaO | 2.1 | 5.4 | 3.0 | 0.8 | — |
|  | BaO | 3.5 | 13.2 | 2.0 | 5.9 | 1.3 |
|  | SrO | 6.5 | 4.0 | 9.0 | 3.0 | 0.8 |
|  | ZnO | 0.5 | 1.5 | — | 1.0 | 3.1 |
|  | $Sb_2O_3$ | 2.5 | 0.3 | 0.6 | 1.0 | 1.1 |
|  | $SnO_2$ | 1.0 | — | — | — | — |
|  | $Cl_2$ | — | 0.06 | 0.3 | 0.2 | 0.4 |
| Fineness | 1500° C. · 1 hr | ○ | ○ | ○ | ○ | ○ |
|  | 1550° C. · 1 hr | ○ | ○ | ○ | ○ | ○ |
| Strain Point (° C.) |  | 665 | 625 | 679 | 665 | 669 |
| Hydrochloric-acid Resistance |  | ○ | ○ | ○ | ○ | ○ |
| Buffered-hydrofluoric-acid Resistance |  | ○ | ○ | ○ | ○ | ○ |

TABLE 5

|  | Sample No. | 11 (wt %) | 12 | 13 | 14 | 15 |
|---|---|---|---|---|---|---|
| Glass Composition | $SiO_2$ | 65.3 | 57.7 | 48.0 | 56.0 | 59.0 |
|  | $Al_2O_3$ | 19.8 | 15.7 | 11.0 | 10.5 | 15.0 |
|  | $B_2O_3$ | 5.6 | 8.5 | 14.5 | 5.5 | 10.5 |
|  | MgO | 0.3 | 3.9 | — | 2.0 | 0.5 |
|  | CaO | 6.2 | 0.8 | — | 3.5 | 4.5 |
|  | BaO | 0.4 | 6.1 | 25.0 | 15.0 | 6.0 |
|  | SrO | 0.5 | 3.3 | — | 6.0 | 3.0 |
|  | ZnO | — | 1.1 | — | — | — |
|  | $Sb_2O_3$ | 1.4 | 2.4 | 0.5 | 0.3 | 0.9 |
|  | $SnO_2$ | — | — | 0.5 | 0.9 | 0.3 |
|  | $Cl_2$ | 0.5 | 0.5 | 0.5 | 0.3 | 0.3 |
| Fineness | 1500° C. · 1 hr | ○ | ○ | ◎ | ◎ | ◎ |
|  | 1550° C. · 1 hr | ○ | ○ | ◎ | ◎ | ◎ |
| Strain Point (° C.) |  | 712 | 655 | 595 | 640 | 645 |
| Hydrochloric-acid Resistance |  | ○ | ○ | ○ | ○ | ○ |
| Buffered-hydrofluoric-acid Resistance |  | ○ | ○ | ○ | ○ | ○ |

TABLE 6

| Sample No. | | 16 | 17 | 18 | 19 | 20 |
|---|---|---|---|---|---|---|
| | | (wt %) | | | | |
| Glass Composition | $SiO_2$ | 58.0 | 63.0 | 66.0 | 54.0 | 64.5 |
| | $Al_2O_3$ | 16.0 | 18.0 | 19.5 | 19.5 | 19.0 |
| | $B_2O_3$ | 8.5 | 8.0 | 5.5 | 10.5 | 6.0 |
| | MgO | 1.0 | 5.0 | — | — | 0.5 |
| | CaO | 4.0 | — | 6.5 | 3.0 | 6.0 |
| | BaO | 9.5 | 1.0 | 0.5 | 2.0 | 0.5 |
| | SrO | 2.0 | 1.0 | 0.5 | 8.5 | 0.5 |
| | ZnO | — | 3.0 | 0.5 | — | — |
| | $Sb_2O_3$ | 0.3 | 0.6 | 0.3 | 1.2 | 2.3 |
| | $SnO_2$ | 0.5 | 0.3 | 0.6 | 1.2 | 0.5 |
| | $Cl_2$ | 0.2 | 0.1 | 0.1 | 0.1 | 0.2 |
| Fineness | 1500° C. · 1 hr | ◉ | ◉ | ◉ | ◉ | ◉ |
| | 1550° C. · 1 hr | ◉ | ◉ | ◉ | ◉ | ◉ |
| Strain Point (° C.) | | 660 | 670 | 710 | 675 | 700 |
| Hydrochloric-acid Resistance | | ○ | ○ | ○ | ○ | ○ |
| Buffered-hydrofluoric-acid Resistance | | ○ | ○ | ○ | ○ | ○ |

In the composition of each of the glasses shown in these Tables, the content of each component is represented in terms of oxide and except that the amount of chloride remaining in the glass is represented in terms of $Cl_2$.

Each of the samples was prepared as follows.

Glass materials were mixed to obtain a glass composition specified in these Tables. $BaCl_2$ was used as chloride. Then, a glass plate was prepared therefrom and subjected to evaluation of the fineness in the manner similar to Example 1. The result is shown in Tables 3–6. Each of the glass sample plates is seen from the tables to be excellent, that is, "good" or "very good" in the fineness.

On the other hand, the glass batch was also melted in an electric furnace at 1550–1600° C. for 16–24 hours to obtain glass melt. The glass melt was formed into a glass sample plate. The glass sample plate thus obtained was evaluated for heat resistance and chemical resistance. The result is shown in Tables 3 through 6.

As is obvious from Tables, each of the glass sample plates was excellent in the heat resistance and chemical resistance.

For evaluating the heat resistance, the strain point was measured by the use of the ASTM C336-71 method. The chemical resistance was evaluated for the hydrochloric-acid resistance. Specifically, after each sample plate was immersed for 24 hours in a 10 wt % hydrochloric acid solution held at 80° C., the surface condition of the glass sample plate was observed. The symbol X represents occurrence of discoloration while the symbol ○ represents no discoloration. On the other hand, the buffered-hydrofluoric-acid resistance was evaluated in the following manner. Specifically, after each sample plate was immersed for 30 minutes in a buffered hydrofluoric acid solution held at 20° C. and comprising 38.7 wt % ammonium fluoride and 1.6 wt % hydrofluoric acid, the surface condition of the glass sample plate was observed. The symbol X represents occurrence of cloudness on the surface of the glass sample plate while the symbol ○ represents no change.

As described above, according to the present invention, it is possible to produce the alkali-free glass which has an excellent fineness and is free from bubbles resulting in the display defect, by the use of a combination of $Sb_2O_3$ and at least one of $SnO_2$ and chloride as the fining agent.

Furthermore, the alkali-free glass according to the present invention is free from bubbles resulting in the display defect and excellent in heat resistance and chemical resistance. Therefore, the alkali-free glass is particularly suitable as a transparent glass substrate for a liquid crystal display.

What is claimed is:

1. A method of producing an alkali-free glass having a basic composition consisting essentially, by weight, of 40–70% $SiO_2$, 6–25% $Al_2O_3$, 5–20% $B_2O_3$, 0–10% MgO, 4.5–15% CaO, 0–30% BaO, 0–10% SrO, and 0–10% ZnO, and containing substantially no alkali metal oxide, said method comprising the steps of preparing a glass batch of the basic composition, including an addition of a fining agent consisting of a combination of 0.05–3% $Sb_2O_3$, and at least one of 0.05–2% $SnO_2$ and 0.01–2 wt % chloride in terms of $Cl_2$, melting said glass batch into a glass melt, and forming said glass melt into a desired shape.

2. A method of producing an alkali-free glass as claimed in claim 1, said alkali-free glass being for use as a transparent glass substrate for a liquid crystal display.

3. A method of producing an alkali-free glass as claimed in claim 1, wherein said fining agent consists of 0.05–3% $Sb_2O_3$, 0.05–2% $SnO_2$, and 0.01–2 wt % chloride in terms of $Cl_2$.

4. A method of producing an alkali-free glass as claimed in claim 1, wherein said fining agent consists of 0.05–2% $Sb_2O_3$ and 0.05–2% $SnO_2$.

5. A method of producing an alkali-free glass as claimed in claim 1, wherein said fining agent consists of 0.05–3% $Sb_2O_3$ and 0.01–2 wt % chloride in terms of $Cl_2$.

* * * * *